US012794595B2

(12) United States Patent
Cui et al.

(10) Patent No.: US 12,794,595 B2
(45) Date of Patent: Nov. 10, 2026

(54) SYSTEMS AND METHODS FOR ENABLING OR DISABLING HARQ FEEDBACK

(71) Applicant: ZTE Corporation, Shenzhen (CN)

(72) Inventors: Fangyu Cui, Shenzhen (CN); Nan Zhang, Shenzhen (CN); Junli Li, Shenzhen (CN); Yachao Yin, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 314 days.

(21) Appl. No.: 18/614,083

(22) Filed: Mar. 22, 2024

(65) Prior Publication Data

US 2024/0291595 A1 Aug. 29, 2024

Related U.S. Application Data

(63) Continuation of application No. PCT/CN2022/129124, filed on Nov. 2, 2022.

(51) Int. Cl.

*H04W 76/20* (2018.01)
*H04L 1/1812* (2023.01)
*H04W 72/231* (2023.01)
*H04W 84/06* (2009.01)

(52) U.S. Cl.

CPC ......... *H04L 1/1812* (2013.01); *H04W 72/231* (2023.01); *H04W 76/20* (2018.02); *H04W 84/06* (2013.01)

(58) Field of Classification Search

CPC ..... H04W 76/20; H04W 72/23; H04W 72/12; H04W 72/11; H04W 72/04; H04W 72/21; H04W 72/14; H04W 84/06; H04W 28/04; H04W 28/06; H04W 24/08; H04W 4/70; H04L 1/18; H04L 1/00; H04L 1/08; H04L 1/16; H04L 5/00; H04L 27/00

USPC .......................................................... 370/329

See application file for complete search history.

(56) References Cited

U.S. PATENT DOCUMENTS

| | | | | |
|---|---|---|---|---|
| 11,595,159 | B2 * | 2/2023 | Ye | H04W 76/11 |
| 11,722,263 | B2 * | 8/2023 | Muruganathan | H04L 1/1607 370/329 |
| 11,881,948 | B2 * | 1/2024 | Ji | H04L 1/1664 |
| 11,929,831 | B2 * | 3/2024 | Shrestha | H04W 72/23 |
| 12,063,179 | B2 * | 8/2024 | Shrestha | H04L 1/1812 |
| 12,206,506 | B2 * | 1/2025 | Wei | H04L 1/1812 |
| 12,426,044 | B2 * | 9/2025 | Tsai | H04L 1/08 |

(Continued)

FOREIGN PATENT DOCUMENTS

| | | |
|---|---|---|
| CN | 110463102 A | 11/2019 |
| CN | 113994615 A | 1/2022 |

(Continued)

OTHER PUBLICATIONS

Notice of Final Rejection for JP Appl. No. 2024-518360, dated Jul. 7, 2025 (with English translation, 6 pages).

(Continued)

*Primary Examiner* — Man U Phan
(74) *Attorney, Agent, or Firm* — Foley & Lardner LLP

(57) ABSTRACT

Presented are systems and methods for enabling or disabling hybrid automatic repeat request (HARQ) feedback. A wireless communication device (e.g., a UE) may receive a first signaling and a second signaling from a wireless communication node (e.g., a BS). The wireless communication device may determine whether at least one hybrid automatic repeat request (HARQ) feedback of at least one HARQ process is to be disabled, according to the first signaling and the second signaling.

6 Claims, 5 Drawing Sheets

(56) References Cited

U.S. PATENT DOCUMENTS

| | | | | |
|---|---|---|---|---|
| 2022/0294569 | A1* | 9/2022 | Matsuda | H04L 1/1812 |
| 2022/0303065 | A1 | 9/2022 | Hosseinian et al. | |
| 2022/0329363 | A1 | 10/2022 | Lee et al. | |
| 2024/0072939 | A1* | 2/2024 | Niu | H04L 1/1812 |
| 2025/0056553 | A1* | 2/2025 | Liu | H04L 5/0055 |
| 2025/0227715 | A1* | 7/2025 | Xin | H04L 1/1812 |
| 2025/0293811 | A1* | 9/2025 | Ye | H04L 1/1896 |

FOREIGN PATENT DOCUMENTS

| | | | |
|---|---|---|---|
| CN | 115174009 | A | 10/2022 |
| WO | WO-2022/152944 | A1 | 7/2022 |

OTHER PUBLICATIONS

ETRI: "Discussion on HARQ-ACK feedback for multicast of RRC_Connected UEs", 3GPP Draft; R1-2105648, May 12, 2021 (3 pages).

Extended European Search Report on EP Appl. No. 22958321.6 dated May 9, 2025 (7 pages).

Final Notification of Reasons for Refusal for JP Appl. No. 2024-518360, dated Oct. 30, 2025 (with English translation, 3 pages).

First Office Action for CN Appl. No. 202280095926.6, dated Oct. 29, 2025 (with English translation, 19 pages).

CMCC, "Considerations on HARQ for Non-Terrestrial Networks", 3GPP TSG RAN WG1 #99, R1- 1912537, Nov. 22, 2019, (5 pages).

International Search Report and Written Opinion for PCT Appl. No. PCT/CN2022/129124 mailed Jun. 25, 2023 (6 pages).

Xiaomi, "Discussion on disabling of HARQ feedback" 3GPP TSG-RAN2 #119bis, R2-2210036, Oct. 19, 2022, Online (4 pages).

NEC, "Disabling of HARQ feedback for IoT NTN", 3GPP TSG RAN WG1 #110bis-e, R1-2209157, Oct. 19, 2022 (5 pages).

Notice of Reasons for Rejection for JP Appl. No. 2024-518360, dated Feb. 14, 2025 (with English translation, 5 pages).

* cited by examiner

SYSTEMS AND METHODS FOR ENABLING OR DISABLING HARQ FEEDBACK

CROSS-REFERENCE TO RELATED APPLICATION

This application claims the benefit of priority under 35 U.S.C. § 120 as a continuation of PCT Patent Application No. PCT/CN2022/129124, filed on Nov. 2, 2022, the disclosure of which is incorporated herein by reference in its entirety.

TECHNICAL FIELD

The disclosure relates generally to wireless communications, including but not limited to systems and methods for enabling or disabling HARQ feedback.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium of the following. A wireless communication device (e.g., a UE) may receive a first signaling (e.g., a downlink control information (DCI) signaling) and a second signaling (e.g., a higher layer signaling) from a wireless communication node (e.g., a BS). The wireless communication device may determine whether at least one hybrid automatic repeat request (HARQ) feedback of at least one HARQ process is to be disabled, according to the first signaling and the second signaling.

In some embodiments, the first signaling may comprise a downlink control information (DCI) signaling. The second signaling may comprise a higher layer signaling. The higher layer signaling may comprise at least one of: a radio resource control (RRC) signaling, a media access control control element (MAC CE) signaling, or a system information block (SIB) signaling. The DCI signaling may include a one-bit value to indicate whether the at least one HARQ feedback, for at least one transport block and/or at least one HARQ process, is to be disabled.

In some embodiments, the DCI signaling may include a bitmap to indicate whether a respective HARQ feedback corresponding to each of a plurality of transport blocks is to be disabled. The DCI signaling may include a bitmap to indicate whether a respective HARQ feedback corresponding to each of a plurality of HARQ processes is to be disabled.

In some embodiments, the wireless communication device may determine in response to a field for enabling or disabling HARQ feedback being absent in the DCI signaling, that: a configuration of the at least one HARQ feedback is unchanged, a configuration of the at least one HARQ feedback is absent, or the HARQ feedback is enabled. The second signaling (e.g., the higher layer signaling) may include an indication of whether the first signaling is to be used in indicating whether the at least one HARQ feedback is to be disabled. The indication of whether the first signaling is to be used in indicating whether the at least one HARQ feedback is to be disabled, can be specific to at least one of: the wireless communication device, or each of the at least one HARQ process.

In some embodiments, the wireless communication device may receive a third signaling from the wireless communication node. The third signaling may (be used to) indicate whether the at least one HARQ feedback for the at least one HARQ process is to be disabled. The third signaling may comprise a radio resource control (RRC) signaling.

In some embodiments, the wireless communication device may determine whether the at least one HARQ feedback of the at least one HARQ process is to be disabled according to the first signaling, when the second signaling indicates that the first signaling is to be used in indicating whether the HARQ feedback is to be disabled regardless of the third signaling's indication.

In some embodiments, the wireless communication device may determine whether the at least one HARQ feedback of the at least one HARQ process is to be disabled according to the third signaling, when the second signaling indicates that the first signaling is to be used in indicating whether the HARQ feedback is to be disabled, and a field for enabling or disabling HARQ feedback is absent (e.g., not detected) in the first signaling.

In some embodiments, the wireless communication device may determine whether the at least one HARQ feedback of the at least one HARQ process is to be disabled according to the third signaling, when the second signaling indicates that the first signaling is not to be used in indicating whether the HARQ feedback is to be disabled.

In some embodiments, the second signaling (e.g., the higher layer signaling) may include an indication of whether the at least one HARQ feedback for the at least one HARQ process is to be disabled. The DCI signaling may include a one-bit value to indicate whether to invert (e.g., reverse, or make opposite) the second signaling's indication of whether HARQ feedback for at least one transport block is to be disabled.

In some embodiments, the DCI signaling may include a bitmap to indicate whether to invert a respective indication from the second signaling on whether HARQ feedback for a respective one of a plurality of transport blocks is to be disabled. In some embodiments, the DCI signaling may include a bitmap to indicate whether to invert a respective indication from the second signaling on whether HARQ feedback for a respective one of a plurality of HARQ processes is to be disabled. The wireless communication device may determine whether the at least one HARQ feedback of the at least one HARQ process is disabled according to the second signaling, when a field for inverting or maintaining the second signaling's indication of whether the at least one HARQ feedback for the at least one HARQ process is to be disabled, is absent in the DCI signaling.

In some embodiments, a wireless communication node (e.g., a BS) may send a first signaling (e.g., a downlink control information (DCI) signaling) and a second signaling (e.g., a higher layer signaling) to a wireless communication device (e.g., a UE). The first signaling and the second signaling can (e.g., collectively) indicate whether to disable at least one hybrid automatic repeat request (HARQ) feedback of at least one HARQ process.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

1. Mobile Communication Technology and Environment

Figure 1:
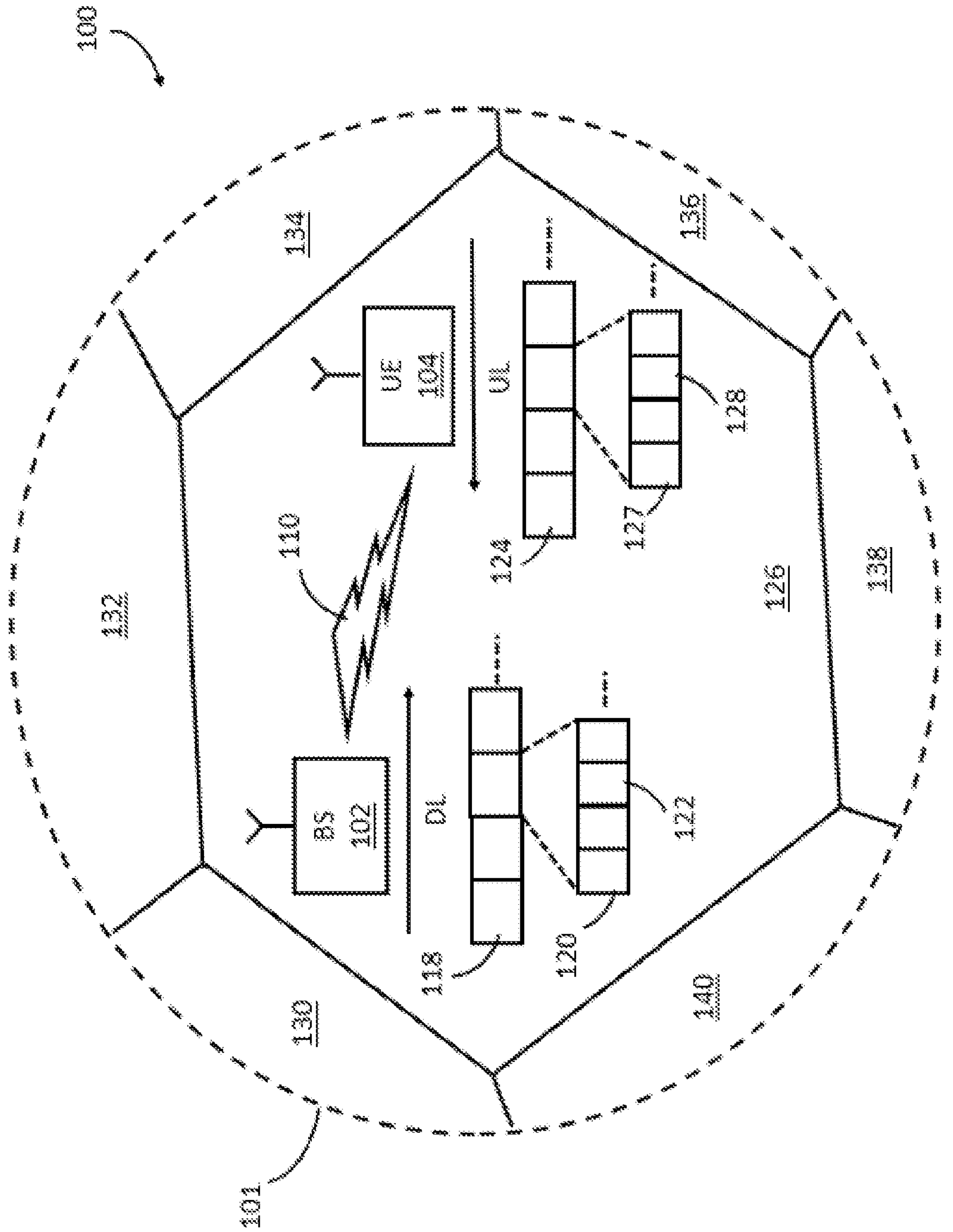
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical arca 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
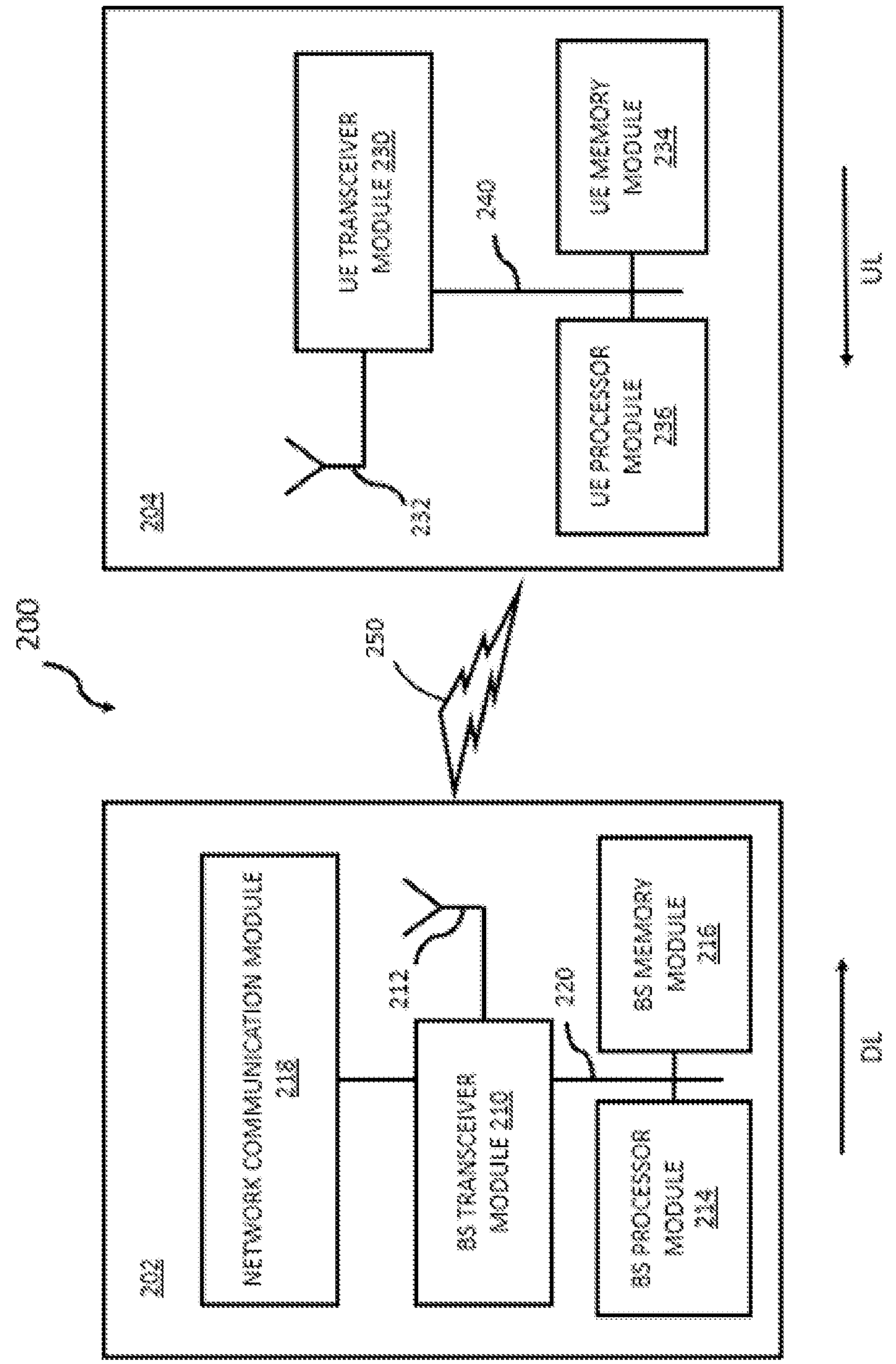
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

2. Systems and Methods for HARQ Feedback Enabling-Disabling Configuration

In a terrestrial network (TN), a hybrid automatic repeat request (HARQ) mechanism may improve transmission reliability. After a transmission, a transmitter may perform a new transmission or retransmission in the same HARQ process after receiving HARQ-acknowledgement (ACK) feedback (e.g., acknowledgement/response regarding receipt/non-receipt of transmission) from a receiver. The HARQ-ACK feedback can be used to confirm whether transmitted data has been successfully received. When a propagation delay is long, e.g., in a non-terrestrial network (NTN), the HARQ process can wait a long time for the feedback before the next transmission. If all of the HARQ processes have completed a transmission but none of the feedback is received due to large round trip time (RTT) (e.g., round trip delay), a transmitter may stop transmitting and HARQ stalling may occur. In order to avoid the HARQ stalling and to increase throughput, HARQ feedback disabling (e.g., disabling of a portion of the HARQ process that is associated with waiting for the feedback and/or processing of the feedback) can be applied in a new radio (NR)-NTN system.

However, HARQ feedback disabling can be selective. In order to enhance coverage and increase the detection performance, repetition can be applied for data transmission in for instance Narrowband-Internet of Things (NB-IoT) or enhanced Machine Type Communication (eMTC) over the NTN. When one HARQ process is enabled, disabling the HARQ feedback may indicate that no feedback may be provided, which may cause some problems (e.g., modulation order and/or power control may not be adapted to a channel condition). Hence, a dynamic configuration of HARQ feedback enabling/disabling may be beneficial for making a tradeoff between throughput and detection performance.

Figure 3:
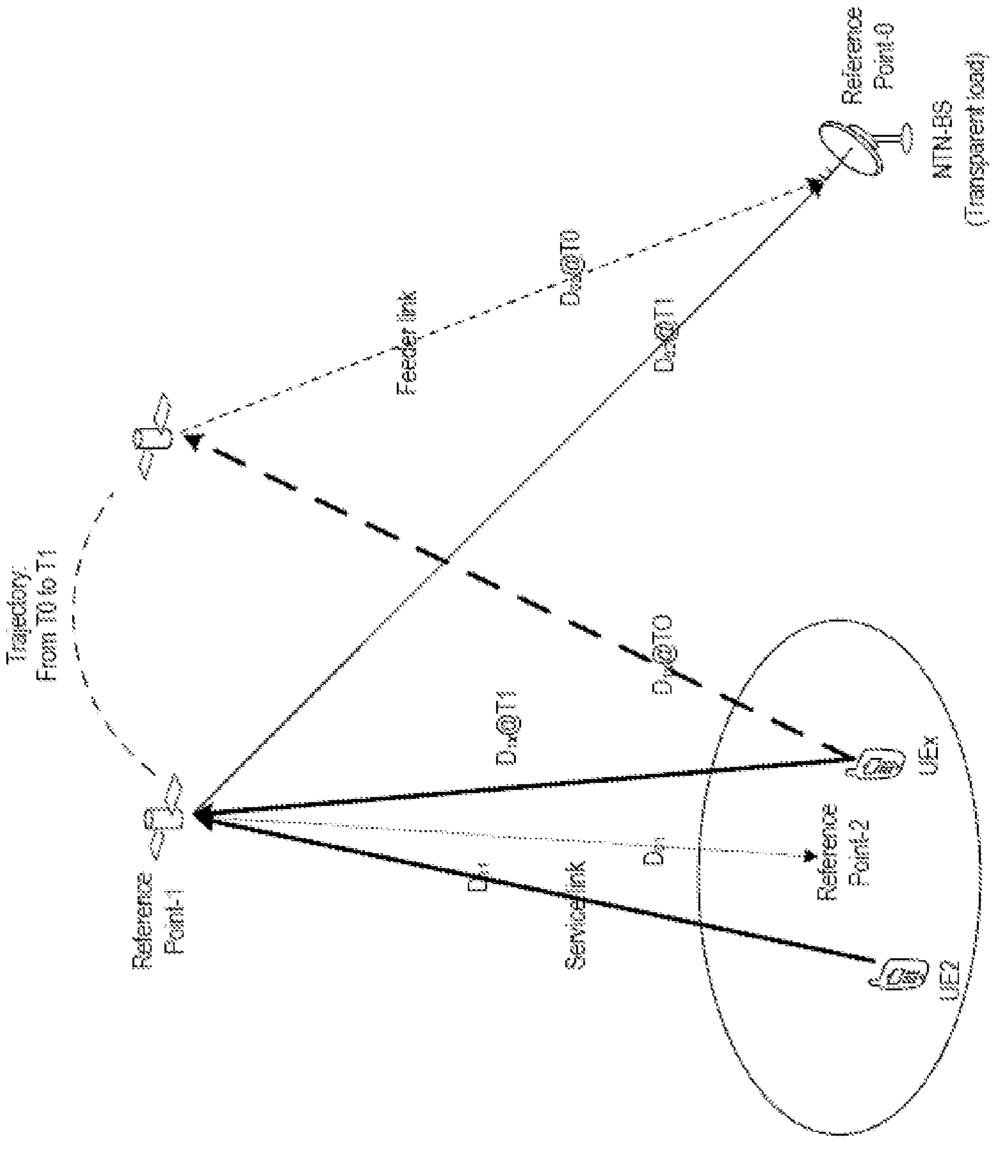
FIG. 3 illustrates an example implementation of a non-terrestrial network (NTN), in accordance with some embodiments of the present disclosure.

FIG. 3 illustrates an example structure of a transparent NTN, in accordance with some embodiments of the present disclosure. A link between a UE (e.g., a user equipment, the UE 104, the UE 204, a mobile device, a wireless communication device, a terminal, etc.) and a satellite can be a service link. A link between a BS (e.g., a base station, the BS 102, the BS 202, a gNB, an cNB, a wireless communication node, etc.) and a satellite can be a feeder link and can be common for all UEs within the same cell. Due to high altitude of the satellite, a propagation delay can be large. For an NTN, especially with the aerial vehicular entity in geosynchronous equatorial orbit (GEO), the RTT between the UE and the BS can be as long as several hundreds of milliseconds due to long (signal transmission/propagation) distance(s). In low earth orbit (LEO), the RTT between the UE and the BS can be a few milliseconds to tens of milliseconds.

Figure 4:
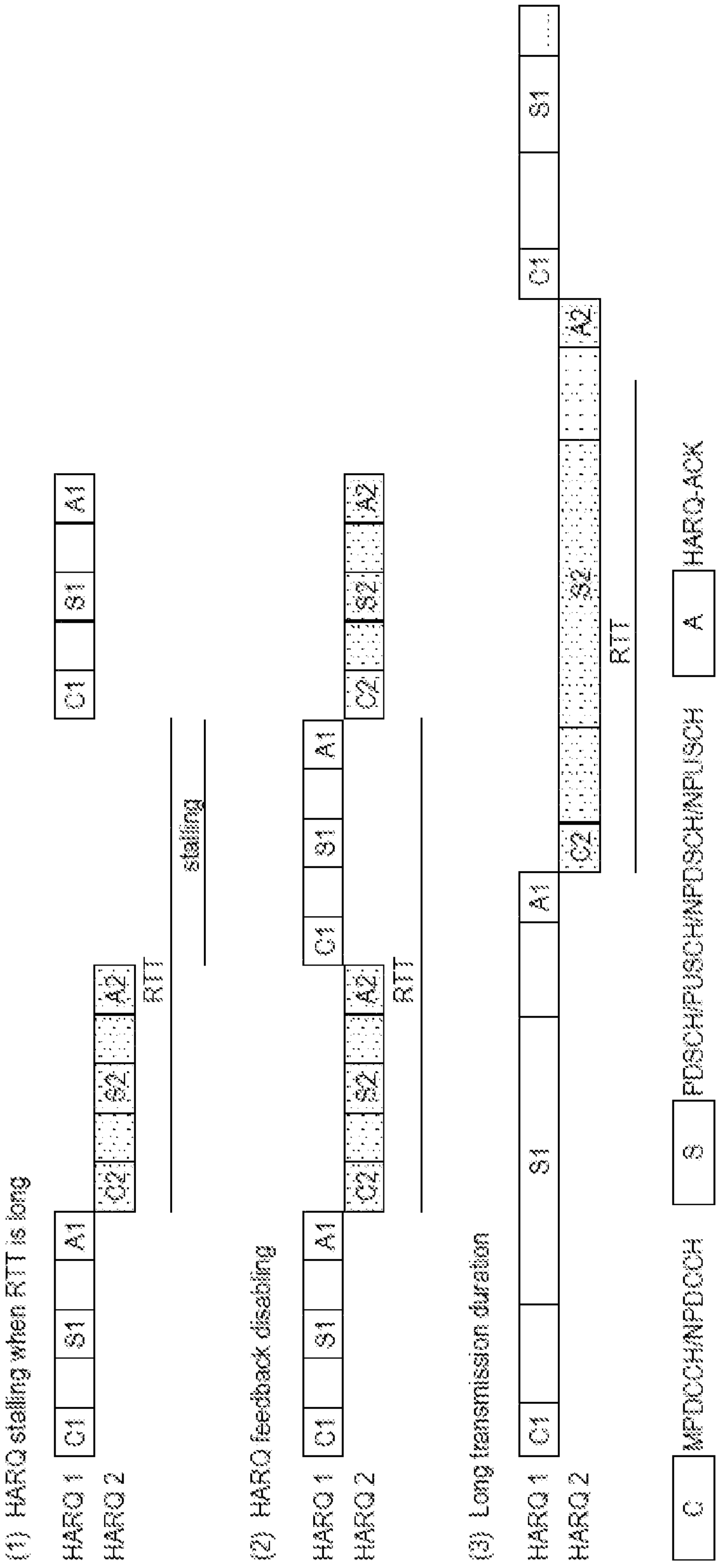
FIG. 4 illustrates an example representation of hybrid automatic repeat request (HARQ) stalling and HARQ feedback disabling, in accordance with some embodiments of the present disclosure.

FIG. 4 illustrates representations of HARQ stalling and HARQ feedback disabling, in accordance with some embodiments of the present disclosure. The HARQ feedback disabling can be implemented at least for new radio (NR)-NTN based on a semi-static configuration. The network can disable the feedback of at least one HARQ process through a radio resource control (RRC) signaling. By disabling the HARQ feedback of one HARQ process, a UE can continuously transmit new transport blocks (TBs) without performing a stop and wait procedure as shown in (2) of FIG. 4. As a result, the HARQ stalling due to a large RTT can be avoided and throughput can be increased. However, detection performance can decrease at a same time when there is no HARQ retransmission. Hence, HARQ feedback disabling can be configured in NR-NTN to make a tradeoff between throughput and detection performance.

Repetition can be applied in data transmission (e.g., in IoT-NTN or eMTC) to improve the detection performance at a receiver. If a repetition number (of data transmission) is large enough, a duration of transmitting one TB may be longer than the RTT. In such a case, the HARQ stalling may be less probable even if HARQ feedback is enabled as shown in (3) of FIG. 4. For single HARQ process UE, disabling the HARQ feedback may prohibit link adaption due to absent of feedback information. Therefore, a dynamic configuration mechanism for HARQ feedback disabling can be investigated.

Implementation Example 1: HARQ Feedback Enabling/Disabling Based on DCI Configuration A dynamic configuration of HARQ feedback enabling/disabling may be configured in IoT-NTN to make a tradeoff between throughput and performance. A downlink control information (DCI) may be transmitted for each scheduling of transmission. The DCI can be a proper signaling to carry the configuration information. At least one of following examples may be considered for the configuration.

Example-1: A bit field (e.g., a field of one or more bits in length) in DCI can be defined to indicate whether HARQ feedback for at least one transport block scheduled by the DCI is disabled. For example, a one bit field can be defined. If "1" is indicated in the bit field by the network, the HARQ feedback can be disabled. If "0" is indicated in the bit field by the network, the HARQ feedback can be enabled, or vice versa. The bit field may be newly defined or re-interpreted from existing bit field in the DCI (including reserved bit field).

Example-2: When multiple transport blocks are scheduled by the DCI, a bitmap can be indicated in the DCI to configure which of the multiple transport blocks are HARQ feedback disabled. For example, when two TBs are scheduled, two bits can be defined for the two TBs respectively to show the configuration of HARQ feedback enabling/disabling. The bit field may be newly defined or re-interpreted (e.g., repurposed) from current/existing bit field in the DCI (including reserved bit field).

Example-3: When multiple HARQ processes are used, a bitmap can be indicated in the DCI to configure which of the HARQ processes are HARQ feedback disabled. For example, when two HARQ processes are used, two bits can be defined for the two HARQ processes respectively to show the configuration of HARQ feedback enabling/disabling. The bit field may be newly defined or re-interpreted from a current/existing bit field in the DCI (including reserved bit field).

Example-4: When the bit field for HARQ feedback enabling/disabling configuration in the DCI is absent, the HARQ feedback configuration can be unchanged (e.g., same as the previous DCI configuration).

Example-5: When the bit field for HARQ feedback enabling/disabling configuration in the DCI is absent, the UE may determine that there is no DCI configuration for HARQ feedback enabling/disabling. A RRC based HARQ feedback enabling/disabling configuration may be applied.

Example-6: When the bit field for HARQ feedback enabling/disabling configuration in the DCI is absent, the HARQ feedback can be enabled.

From above examples, the UE may receive a first signaling, a second signaling, and/or a third signaling. The UE may determine whether at least one hybrid automatic repeat request (HARQ) feedback of at least one HARQ process (and/or at least one transport block) is to be disabled, according to at least one of: the first signaling, the second signaling, or the third signaling. In some embodiments, the BS may determine whether to configure at least one hybrid automatic repeat request (HARQ) feedback of at least one HARQ process to be disabled or not. The BS may send at least one of: a first signaling, a second signaling, or a third signaling to indicate whether the at least one HARQ process feedback to be disabled or not. The bit field for HARQ feedback enabling/disabling configuration may be newly defined or obtained by re-interpreting existing bit field. In order to avoid mis-interpretation of DCI, whether the DCI based HARQ feedback enabling/disabling configuration function is enabled can be configured. The enabling of this function can be semi-statically configured through a higher layer signaling. The higher layer signaling may include at least one of: a radio resource control (RRC) signaling, a media access control control element (MAC CE) signaling, or a system information block (SIB) signaling. An indication of whether the HARQ feedback is to be disabled may be configured to at least one of: per UE or per HARQ process. For example, if an indication of whether the HARQ feedback is to be disabled is disabled for a first UE, the first UE may disable all HARQ feedback of HARQ process on the first UE. The DCI based HARQ feedback enabling/disabling configuration function may be enabled per UE or per HARQ process. For example, if DCI based HARQ feedback enabling/disabling configuration function is enabled per UE, the UE may follow the DCI configuration no matter which HARQ process is used. If the function is enabled per HARQ process, the UE may follow the DCI configuration only for the HARQ process which enabled the DCI configuration function.

Implementation Example 2: Interaction Between RRC Based Configuration and DCI Based Configuration In a NR-NTN, a RRC based configuration on enabling/disabling of HARQ feedback may be supported. In a RRC based method, the network may indicate whether HARQ feedback is disabled per HARQ process to the UE. Hence, designing an RRC based configuration method for IoT-NTN may be considered. When both RRC based configuration and DCI based configuration are supported, how to handle the cases where the two configurations are in conflict may be considered.

Since a RRC based solution may be a default solution used in the NR-NTN, while a DCI based solution may be designed for IoT-NTN to handle specific cases, the DCI based solution may have higher priority when both configurations exist. At least one of following examples can be considered.

Example-1: When a DCI based HARQ feedback enabling/disabling configuration function is not enabled (e.g., indicated), a RRC based HARQ feedback enabling/disabling configuration can be adopted. If the DCI based configuration and the RRC based configuration are both not indicated, a HARQ feedback is enabled.

Example-2: When a DCI based HARQ feedback enabling/disabling configuration function is enabled, a DCI based HARQ feedback enabling/disabling configuration may have higher priority than a RRC based HARQ feedback enabling/disabling configuration. If the RRC based configuration is not applied, the DCI based configuration can be applied. If the RRC based configuration exists, the DCI configuration may override/take precedence over the RRC configuration (e.g., the DCI configuration can be higher priority than/preferred over the RRC configuration). The RRC based configuration may be ignored if there is collision between the DCI based configuration and the RRC based configuration.

Example-3: When a DCI based HARQ feedback enabling/disabling configuration function is enabled but not configured, the RRC based HARQ feedback enabling/disabling configuration can be adopted. If the DCI based configuration and the RRC based configuration are not indicated, a HARQ feedback is enabled.

Moreover, the UE may determine whether to disable HARQ feedback based on both information from the RRC signaling and the DCI signaling. For example, the RRC signaling can be used to configure whether HARQ feedback is disabled by default. A DCI signaling can be used to indicate whether the RRC signaling is to be inverted/changed/reversed. At least one of following examples can be considered. This method can be different from the previous examples. The previous examples may directly indicate whether the feedback is disabled via the DCI. In this method, the RRC based configuration can be a baseline, and the DCI signaling may indicate whether the configuration is inverted (e.g., from “enable” to “disable”, or from “disable” to “enable”).

Example-4: A bit field in DCI can be defined to indicate whether the RRC based HARQ feedback enabling/disabling configuration is inverted/changed for the at least one transport block scheduled by the DCI. For example, a one bit field can be defined, where “1” may indicate the RRC based HARQ feedback enabling/disabling configuration is inverted/changed and “0” may indicate the RRC based HARQ feedback enabling/disabling configuration is kept, or vice versa. If the bit field is absent, the RRC based HARQ feedback enabling/disabling configuration (if enabled or available) can be kept/maintained.

Example-5: When multiple transport blocks are scheduled by the DCI, a bitmap can be indicated in the DCI to indicate for which of the HARQ processes corresponding to the transport blocks, the RRC based HARQ feedback enabling/disabling configurations can be inverted/changed. For example, when two TBs are scheduled, two bits can be defined for the two HARQ processes respectively to show whether the corresponding RRC based configuration of HARQ feedback enabling/disabling are inverted/changed. If the bit field is absent, the RRC based HARQ feedback enabling/disabling configuration can be kept/maintained.

Example-6: When multiple HARQ processes are used, a bitmap can be indicated in the DCI to configure which of the RRC based HARQ feedback enabling/disabling configurations are inverted/changed. For example, when two HARQ processes are used, two bits can be defined for the two TBs respectively to show the configuration of HARQ feedback enabling/disabling. If the bit field is absent, the RRC based HARQ feedback enabling/disabling configuration can be kept/maintained.

It should be understood that one or more features from the above implementation examples are not exclusive to the specific implementation examples, but can be combined in any manner (e.g., in any priority and/or order, concurrently or otherwise).

Figure 5:
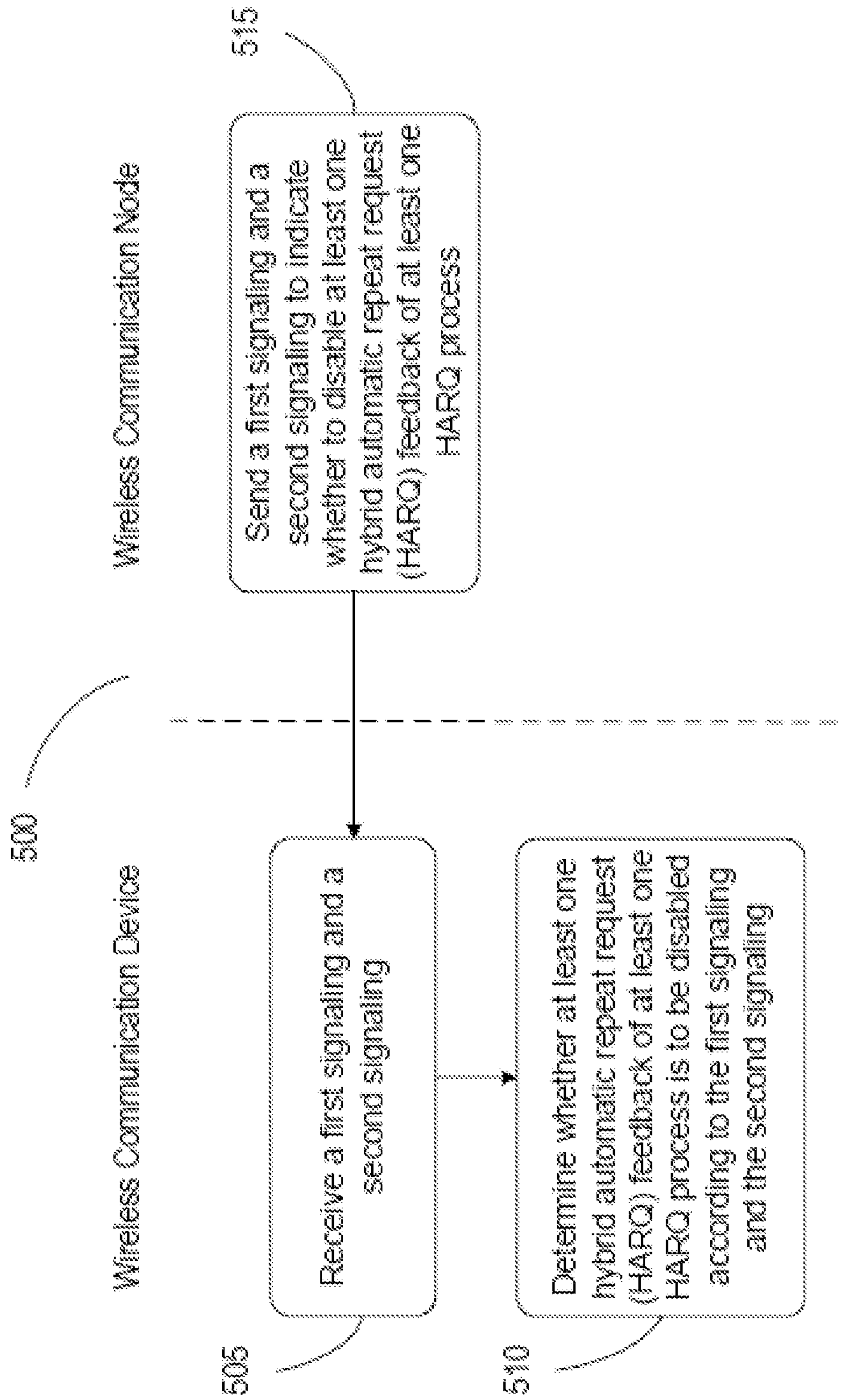
FIG. 5 illustrates a flow diagram of an example method for enabling or disabling HARQ feedback, in accordance with an embodiment of the present disclosure.

FIG. 5 illustrates a flow diagram of a method 500 for enabling or disabling HARQ feedback. The method 500 may be implemented using any one or more of the components and devices detailed herein in conjunction with FIGS. 1-4. In overview, the method 500 may be performed by a wireless communication device (e.g., a UE), in some embodiments. Additional, fewer, or different operations may be performed in the method 500 depending on the embodiment. At least one aspect of the operations is directed to a system, method, apparatus, or a computer-readable medium.

A wireless communication device (e.g., a UE) may receive a first signaling (e.g., a downlink control information (DCI) signaling) and a second signaling (e.g., a higher layer signaling) from a wireless communication node (e.g., a BS). The wireless communication device may determine whether at least one hybrid automatic repeat request (HARQ) feedback of at least one HARQ process is to be disabled, according to the first signaling and the second signaling.

In some embodiments, the first signaling may comprise/be a downlink control information (DCI) signaling. The second signaling may comprise/be a higher layer signaling. The higher layer signaling may comprise/be at least one of: a radio resource control (RRC) signaling, a media access control control element (MAC CE) signaling, or a system information block (SIB) signaling. The DCI signaling may include a one-bit value to indicate whether the at least one HARQ feedback, for at least one transport block, is to be disabled.

In some embodiments, the DCI signaling may include a bitmap to indicate whether a respective HARQ feedback corresponding to each of a plurality of transport blocks is to be disabled. The DCI signaling may include a bitmap to indicate whether a respective HARQ feedback corresponding to each of a plurality of HARQ processes is to be disabled (e.g., each bit of the bitmap corresponding to HARQ feedback of a respective one of the HARQ processes).

In some embodiments, the wireless communication device may determine in response to a field for enabling or disabling HARQ feedback being absent (e.g., not detected) in the DCI signaling, that: a configuration of the at least one HARQ feedback is unchanged, a configuration of the at least one HARQ feedback is absent, or the HARQ feedback is enabled. The second signaling (e.g., the higher layer signaling) may include an indication of whether the first signaling is to be used in indicating whether the at least one HARQ feedback is to be disabled. The indication of whether the first signaling is to be used in indicating whether the at least one HARQ feedback is to be disabled, can be specific to at least one of: the wireless communication device, or each of the at least one HARQ process.

In some embodiments, the wireless communication device may receive a third signaling from the wireless communication node. The third signaling may indicate whether the at least one HARQ feedback for the at least one HARQ process is to be disabled. The third signaling may comprise a radio resource control (RRC) signaling.

In some embodiments, the wireless communication device may determine whether the at least one HARQ feedback of the at least one HARQ process is to be disabled according to the first signaling, when the second signaling indicates that the first signaling is to be used in indicating whether the HARQ feedback is to be disabled regardless of the third signaling's indication.

In some embodiments, the wireless communication device may determine whether the at least one HARQ feedback of the at least one HARQ process is to be disabled according to the third signaling, when (i) the second signaling indicates that the first signaling is to be used in indicating whether the HARQ feedback is to be disabled, and (ii) a field for enabling or disabling HARQ feedback is absent in the first signaling.

In some embodiments, the wireless communication device may determine whether the at least one HARQ feedback of the at least one HARQ process is to be disabled according to the third signaling, when the second signaling indicates that the first signaling is not to be used in indicating whether the HARQ feedback is to be disabled.

In some embodiments, the second signaling (e.g., the higher layer signaling) may include an indication of whether the at least one HARQ feedback for the at least one HARQ process is to be disabled. The DCI signaling may include a one-bit value to indicate whether to invert (e.g., reverse, or make opposite) the second signaling's indication of whether HARQ feedback for at least one transport block is to be disabled.

In some embodiments, the DCI signaling may include a bitmap (e.g., a plurality of bits) to indicate whether to invert a respective indication from the second signaling on whether HARQ feedback for a respective one of a plurality of transport blocks is to be disabled (e.g., each of the bits corresponding to a respective one of the transport blocks). In some embodiments, the DCI signaling may include a bitmap to indicate whether to invert a respective indication from the second signaling on whether HARQ feedback for a respective one of a plurality of HARQ processes is to be disabled. The wireless communication device may determine whether the at least one HARQ feedback of the at least one HARQ process is disabled according to the second signaling, when a field for inverting or maintaining the second signaling's indication of whether the at least one HARQ feedback for the at least one HARQ process is to be disabled, is absent in the DCI signaling.

In some embodiments, a wireless communication node (e.g., a BS) may send a first signaling (e.g., a downlink control information (DCI) signaling) and a second signaling (e.g., a higher layer signaling) to a wireless communication device (e.g., a UE). The first signaling and the second signaling can (e.g., be used collectively to) indicate whether to disable at least one hybrid automatic repeat request (HARQ) feedback of at least one HARQ process.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as “first,” “second,” and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as “software” or a “software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term “module” as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method comprising:

receiving, by a wireless communication device from a wireless communication node, a first signaling and a second signaling, receiving, by the wireless communication device from the wireless communication node, a third signaling, wherein the third signaling indicates whether at least one hybrid automatic repeat request (HARQ) feedback for at least one HARQ process is to be disabled; and determining, by the wireless communication device, whether at least one HARQ feedback of the at least one HARQ process is to be disabled, according to the first signaling, the second signaling, and the third signaling; wherein the determining whether the at least one HARQ feedback of the at least one HARQ process is to be disabled, according to the first signaling, the second signaling, and the third signaling comprises:

determining, by the wireless communication device according to the first signaling, whether the at least one HARQ feedback of the at least one HARQ process is to be disabled, when the second signaling indicates that the first signaling is to be used in indicating whether the HARQ feedback is to be disabled regardless of the third signaling’s indication; or determining, by the wireless communication device according to the third signaling, whether the at least one HARQ feedback of the at least one HARQ process is to be disabled, when the second signaling indicates that the first signaling is not to be used in indicating whether the HARQ feedback is to be disabled, wherein the second signaling indicates whether the first signaling is to be used in indicating whether the at least one HARQ feedback is to be disabled.

2. The method of claim 1, wherein the third signaling comprises a radio resource control (RRC) signaling.

3. A wireless communication device, comprising:

at least one processor configured to:

receive, via a receiver from a wireless communication node, a first signaling and a second signaling, wherein the second signaling indicates whether the first signaling is to be used in indicating whether the at least one hybrid automatic repeat request (HARQ) feedback for at least one HARQ process is to be disabled, wherein the at least one processor is further configured to:

receive, via the receiver from the wireless communication node, a third signaling, wherein the third signaling indicates whether the at least one HARQ feedback for the at least one HARQ process is to be disabled; and determine whether the at least one HARQ feedback of the at least one HARQ process is to be disabled, according to the first signaling, the second signaling, and the third signaling, wherein the determining whether the at least one HARQ feedback of the at least one HARQ process is to be disabled, according to the first signaling, the second signaling, and the third signaling comprises:

determine, according to the first signaling, whether the at least one HARQ feedback of the at least one HARQ process is to be disabled, when the second signaling indicates that the first signaling is to be used in indicating whether the HARQ feedback is to be disabled regardless of the third signaling's indication or determining, according to the third signaling, whether the at least one HARQ feedback of the at least one HARQ process is to be disabled, when the second signaling indicates that the first signaling is not to be used in indicating whether the HARQ feedback is to be disabled.

4. The wireless communication device of claim 3, wherein the third signaling comprises a radio resource control (RRC) signaling.

5. A wireless communication node, comprising:

at least one processor configured to:

send, via a transmitter to a wireless communication device, a first signaling and a second signaling to indicate whether to disable at least one hybrid automatic repeat request (HARQ) feedback of at least one HARQ process, wherein the second signaling indicates whether the first signaling is to be used in indicating whether the at least one HARQ feedback is to be disabled, wherein the at least one processor is configured to:

send, via the transmitter to the wireless communication device, a third signaling, wherein the third signaling indicates whether the at least one HARQ feedback for the at least one HARQ process is to be disabled, wherein it is determined, according to first signaling, the second signaling, and the third signaling, whether the at least one HARQ feedback of the at least one HARQ process is to be disabled, wherein:

it is determined, according to the first signaling, whether the at least one HARQ feedback of the at least one HARQ process is to be disabled, when the second signaling indicates that the first signaling is to be used in indicating whether the HARQ feedback is to be disabled regardless of the third signaling's indication; or it is determined, according to the third signaling, whether the at least one HARQ feedback of the at least one HARQ process is to be disabled, when the second signaling indicates that the first signaling is not to be used in indicating whether the HARQ feedback is to be disabled.

6. The wireless communication node of claim 5, wherein the third signaling comprises a radio resource control (RRC) signaling.

* * * * *